United States Patent [19]
Papadopoulos

[11] Patent Number: 6,031,172
[45] Date of Patent: Feb. 29, 2000

[54] MUSIC TEACHING AID

[75] Inventor: Marios Gabriel Papadopoulos, Chartwell, New Zealand

[73] Assignee: Musacus International Limited, Wellington, New Zealand

[21] Appl. No.: 08/874,865

[22] Filed: Jun. 13, 1997

Related U.S. Application Data

[63] Continuation of application No. 08/351,150, Feb. 24, 1995, abandoned, which is a continuation of application No. PCT/NZ93/00047, Jun. 10, 1993.

[30] Foreign Application Priority Data

| Jun. 12, 1992 | [NZ] | New Zealand | 243132 |
| Aug. 27, 1992 | [NZ] | New Zealand | 244120 |
| Feb. 23, 1993 | [NZ] | New Zealand | 245984 |

[51] Int. Cl.[7] .................................................. G09B 15/00
[52] U.S. Cl. .......................... 84/470 R; 84/471 R; 84/474
[58] Field of Search ............................. 84/470 R, 471 R, 84/474

[56] References Cited

U.S. PATENT DOCUMENTS

| 2,958,251 | 11/1960 | Calabro . | |
| 3,572,205 | 3/1971 | Scholfield | 84/474 |
| 4,134,326 | 1/1979 | Hutton | 84/474 |
| 4,305,323 | 12/1981 | Granham | 84/474 |
| 4,716,806 | 1/1988 | Forrest | 84/474 |
| 5,320,020 | 6/1994 | Corley | 84/474 |

FOREIGN PATENT DOCUMENTS

| 4186273 | 3/1992 | Japan . |
| 428308 | 5/1935 | United Kingdom . |
| 2 119 154 | 11/1983 | United Kingdom . |
| 2 190 234 | 11/1987 | United Kingdom . |

*Primary Examiner*—Robert E. Nappi
*Assistant Examiner*—Kim Lockett
*Attorney, Agent, or Firm*—Fulwider Patton Lee & Utecht, LLP

[57] ABSTRACT

A music teaching aid having a number of reference rings that are positioned so as to have independent rotatable movement on a base member. Depending on the shape of the base member, the reference rings are either substantially coaxial cylindrical sleeves or concentric rings. Each reference ring has an outside surface which is divided into segments each of which displays indicia representing a note of the chromatic scale and which is identifiable by a predetermined color coding system such that when segments of the reference rings are aligned in accordance with the predetermined color coding system, corresponding segments of each successive ring will represent the notes of a non-chromatic scale.

12 Claims, 15 Drawing Sheets

MUSIC TEACHING AID

This application is a continuation of application Ser. No. 08/351,150 filed on Feb. 24, 1995, now abandoned, which is a continuation of PCT/NZ93/00047 filed Jun. 10, 1993.

The invention relates to a music teaching aid, in particular, a device that can be used to calculate various forms of musical scales and display them in all keys simultaneously.

TECHNICAL FIELD

Sounds recognised as music can be characterized generally in terms of rhythm and pitch. The pitch is determined by the frequency of the sound wave that is produced by a musical instrument or human larynx. The difference in pitch between a wave of frequency f and a wave of frequency 2f is termed octave and is subdivided into eight "notes" which when played in succession comprise a scale.

An octave, more specifically, consists of 12 half-notes or semitones which when played successively produce a chromatic scale (ie C, C#, D, D#, E, F, F#, G, G#, A, A# and B). The difference in pitch or interval spanning two semitones is called a tone and the sequences of tones and semitones characterize a variety of non-chromatic scales such as the major, harmonic minor and melodic minor scales. The ascending major scale for example is characterized by the succession of two tones, one semitone, three more tones and one more semitone (the scale can also be described in terms of two tetrachords of two tones followed by one semitone, wherein the two tetrachords are separated by a tone). The ascending harmonic minor scale, however, is characterized by one tone, one semitone, two more tones, one more semitone, one and a half tones and a final semitone. Each note of the scale is described by a letter A through G and sharps (#) and flats (♭) are used to describe the semitones that fall between those letters. For example, the interval between A and B is one tone, the semitone above A is A# but can alternatively be described as the semitone below B, or B♭.

Whether a scale will contain certain sharps or flats depends on what the first, tonic, or base note of the scale is. For a major scale, the tonic is C, the scale is said to be in the "key of C major". In that key there are not sharps or flats. However, if the tonic is C sharp (ie C# major key) there are seven sharps and if the tonic is C flat (ie C♭ major key) there are seven flats.

It can be very difficult for a student, and sometimes a music teacher, to determine the correct notes of a certain type of scale in a certain key. However, it becomes even more difficult to rewrite or "transpose" music that has been written in one key into another key. For example, the ascending C major scale is C, D, E, F, G, A, B, C. Transposing it to D major is not simply a matter of replacing each note with the next letter because that will not preserve the sequence of tones and semi tones that characterize a major scale. That is, D major is not D, E, F, G, A, B, C, D, but rather D, E, F#, G, A, B, C#, D (so as to conform to the correct placement of tones and semitones for major scale construction as described above).

Sight is generally regarded to be a more developed sense than hearing and usually a positive reinforcement of our sense of sight is nurtured from a very young age. Evidence of this can be seen at the most basic level, through the individual naming of colours. The prismatic colours of the rainbow are given individual names that set them apart, and give to them an identifiable quality of their own. Colours can be compared with, and associated against, other experiences, feelings, and moods that occur. The same cannot be said of aural perception, or the manner in which the individual tones of the major scale are identified.

Because aural perception is generally not nurtured in the same way from infancy a person will not normally have the capacity to identify musical notes as individual tones with qualities of their own. Music education as it has evolved, has tended to teach music theory from a position of academic explanation, adopting the first seven letters of the alphabet to identify musical notes. Clearly this does not engender a lasting association in terms of the individual quality of the tones but disconnects students at a very early stage in the learning process. For example, the letter C has been ascribed many associations such as Cat, Car, Cartoon etc which reduces the individuality of the letter C prior to being introduced into music education. The same cannot be said for colours.

Evidence of a simultaneous sensory perception called Synaesthesia is well documented. It is believed it to be a type of natural sensory processing that diminishes from infancy due to lack of reinforcement. Chromaesthesia is a specific Synaesthetic condition in which audible sounds produce a colour image in tandem with the audible sensation.

Many attempts have been made to show an analogy between colour and musical tones. These analogies come from various points of view, such as an endeavour to prove the analogy as a mathematical statement of physical fact. Whilst attempts at direct analogy, and the ensuing debate have been useful, the results have not been to the overall advantage of better aural perception, or understanding of music theory. It is the opinion of the inventor that better aural perception can be harnessed in conjunction with an established system and method and this can be obtained by disregarding thinking black and white and attaching the information directly to the other closest occurring natural phenomenon.

By combining the senses of sight, touch and sound, in conjunction with a device that is designed to maintain symmetry of form, this music teaching aid brings together all the disjointed information. It offers the user a ready grasp of the very building blocks of music and thus facilitates their learning and use. It works with the basic units of half-steps of pitch, and is able to display the following relationships for every key.

Invervals—all possible intervals

Scales—all possible types of scales, eg major, minor, and modes

Chords—all chord constructions, in block or arpeggio form.

These are simultaneously displayed in all twelve keys of the commonly used musical system. Thus the device aids transposition (the rendering of music into a different key). Melodies can be quickly transposed and chord substitution (used by musicians to avoid a repetitive or dull-sounding chord sequence) can be easily achieved.

BACKGROUND ART

Music transposition devices are known. Some, such as those disclosed in New Zealand patent specification 168417 and U.S. Pat. Nos. 5,804,460 and 3,791,254, employ a slide rule type arrangement. However students are easily confused and intimidated by a complex array of letters and symbols. Such known devices also suffer from the fact that the student must already possess quite detailed knowledge of music theory to be able to use them effectively.

Another form of music transposition is disclosed in U.S. Pat. No. 4,134,326. The device disclosed in that specification has a number of angular rings that are rotatably mounted on an axle. The names of notes are printed on the peripheral surface of each ring so that when the rings are appropriately aligned, musical relationships can be determined. The primary purpose of the prior art device is however to assist in the transposition of chords. To use the device, the key or tonic note for a particular chord is selected on the first or left hand ring and then each successive ring is aligned with the other notes of the chord. Having done that, the rings can be locked in place and the rings rotated together so that the corresponding type of chord of another key can be read of the device with the assistance of a moveable viewing screen. Modification indicators can be rested onto part of the viewing screen to emphasise those parts of the chord that characterise the particular type of chord eg minor, seventh, augmented etc.

U.S. Pat. No. 4,961,362, disclosed a disk type of calculator assembly which will assist in the calculation of chords and keys and uses a colour chart to assist in defining a conversion scale for roots and inversions.

Patent specification GB 2119154B discloses a musical scale indicator which has eight overlapping circles to display musical scales in twelve keys. The rear surface of the circles displays numbers which when correctly registered with a window sill enable the front of the indicator to display the notes of the chosen scale.

U.S. Pat. No. 3,002,435 discloses a music transposition device which is cylindrical and which carries indicia to represent notes of the chromatic scale. The device has a knob at one end which displays twelve key signature designations. A cylindrical member formed of transparent material to overly the first cylinder is joined to a knob at the other end of the cylinder and displays a series a chord designations.

Disadvantages of the above know devices is that a person must have sufficient knowledge of music theory to be able to utilize the device which are generally cumbersome to hold and difficult to understand and use.

It is the object of this invention to provide a music teaching aid which represents an improvement over known music teaching aids and known music transposition devices in terms of being easy to be used by students with limited knowledge of music theory, and which is versatile and attractive in appearance.

It is a further object of the invention to provide a music teaching aid which employs a specific form or forms of colour coding to assist in the identification and the correlation between musical notes.

It is a yet further object of the invention to provide an optional feature whereby the music teaching aid may include a facility to produce an audible repetitive frequency to enable the music teaching aid to also act as a metronome.

DISCLOSURE OF INVENTION

Accordingly one form of the invention may be said to comprise a music teaching aid comprising a plurality of reference rings each of which is movable independently but maintained in a predetermined spatial relationship to each other, wherein each reference ring has a surface on which is displayed a plurality of segments each of which displays indicia representing a note of the chromatic scale and wherein each segment is individually identifiable by a predetermined colour coding system such that when segments of the reference rings are aligned in accordance with the predetermined colour coding system, corresponding segments of each successive ring will represent the notes of anon-chromatic scale.

Preferably in one form, the reference rings are mounted coaxially on a body so as to have rotary movement on said body with each reference ring being independently rotatable in relation to the contiguous reference ring.

Preferably in another form the reference rings are mounted concentrically on a body so as to have rotatory movement on said body with each reference ring being independently rotatable in relation to the contiguous reference ring.

Preferably the exposed surface of each reference ring is divided into twelve segments.

Preferably each segment is the same size.

Preferably the music teaching aid includes at least seven reference rings.

Preferably the music teaching aid includes means to generate a successive repetitive pulse capable of being reproduced as an audible signal and wherein the delay between successive pulses can be varied within a predetermined range.

Preferably the form of coding the segments consists in allocating a specific colour or range of colours on the surface of the reference rings.

Preferably the coding comprises inscribed indicia on each segment which either consists of or incorporates colours to indicate particular scales of notes.

BRIEF DESCRIPTION OF DRAWINGS

Preferred forms of the music teaching aid of the invention will now be illustrated in the accompanying schematic drawings. These forms are described by way of example only and are not intended to limit the scope of the invention in any way. In the drawings.

MODES FOR CARRYING OUT THE INVENTION

Preferred forms of the invention will now be described with the aid of the accompanying drawings.

Figure 1:
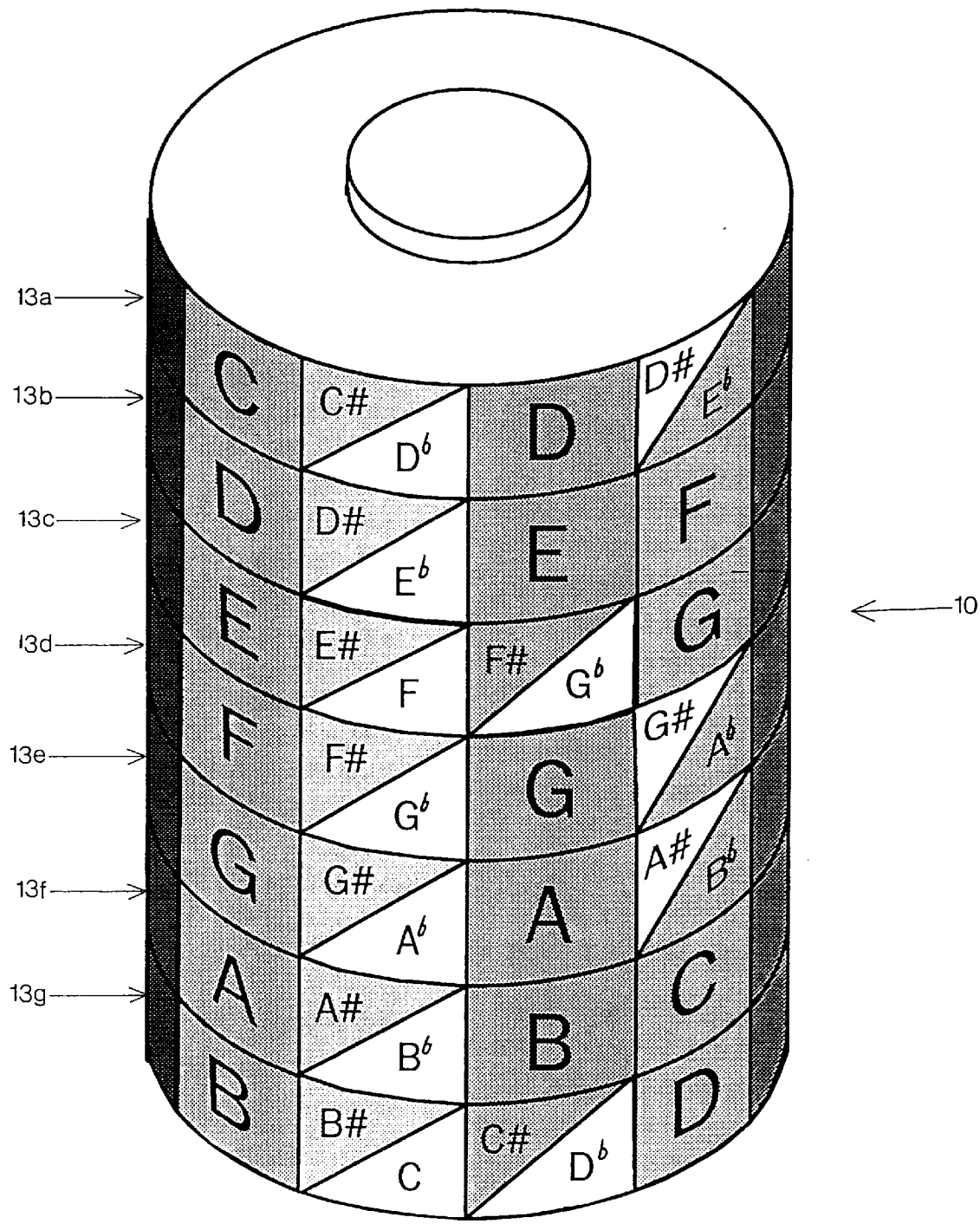
FIG. 1 is a diagrammatic view of one preferred form of the music teaching aid according to the present invention.

Referring to FIG. 1 of the drawings, the music teaching aid comprises a cylindrical body 10, the periphery of which is substantially covered by a plurality of reference rings 13a, 13b, 13c, 13d, 13e, 13f, 13g. In one form, the reference rings are mounted on a common axle (not shown in the drawings) in a manner that the rings can rotate independently of each other.

In another form, the reference rings 13a–13g consists of sleeves which engage over the outside wall of the body 10 so as to have independent rotatory movement thereon. Although not shown in the drawings, each contiguous reference ring can be separated by a shoulder or land projecting radially from the axis or from the wall of the body as appropriate so that the reference rings will be maintained in a fixed longitudinal spatial relationship with each other.

The music teaching aid indicated in FIG. 1 has a seven reference rings 13a–13g which is the minimum number required to include all the notes on any particular scale. While the highly preferred form of the music aid will have seven reference rings, the number of reference rings can be increases to any desired number to suit particular circumstances and usages.

Preferably the reference rings 13a–13g are mounted so there is a resistance against the rotation of each ring either on the axle or against the wall of the body of the music teaching aid.

As will be hereinafter further described, the peripheral surface of each reference ring 13a–13g is divided into twelve segments each of which has an identification which will represent the successive notes of the chromatic scale.

Figure 2:
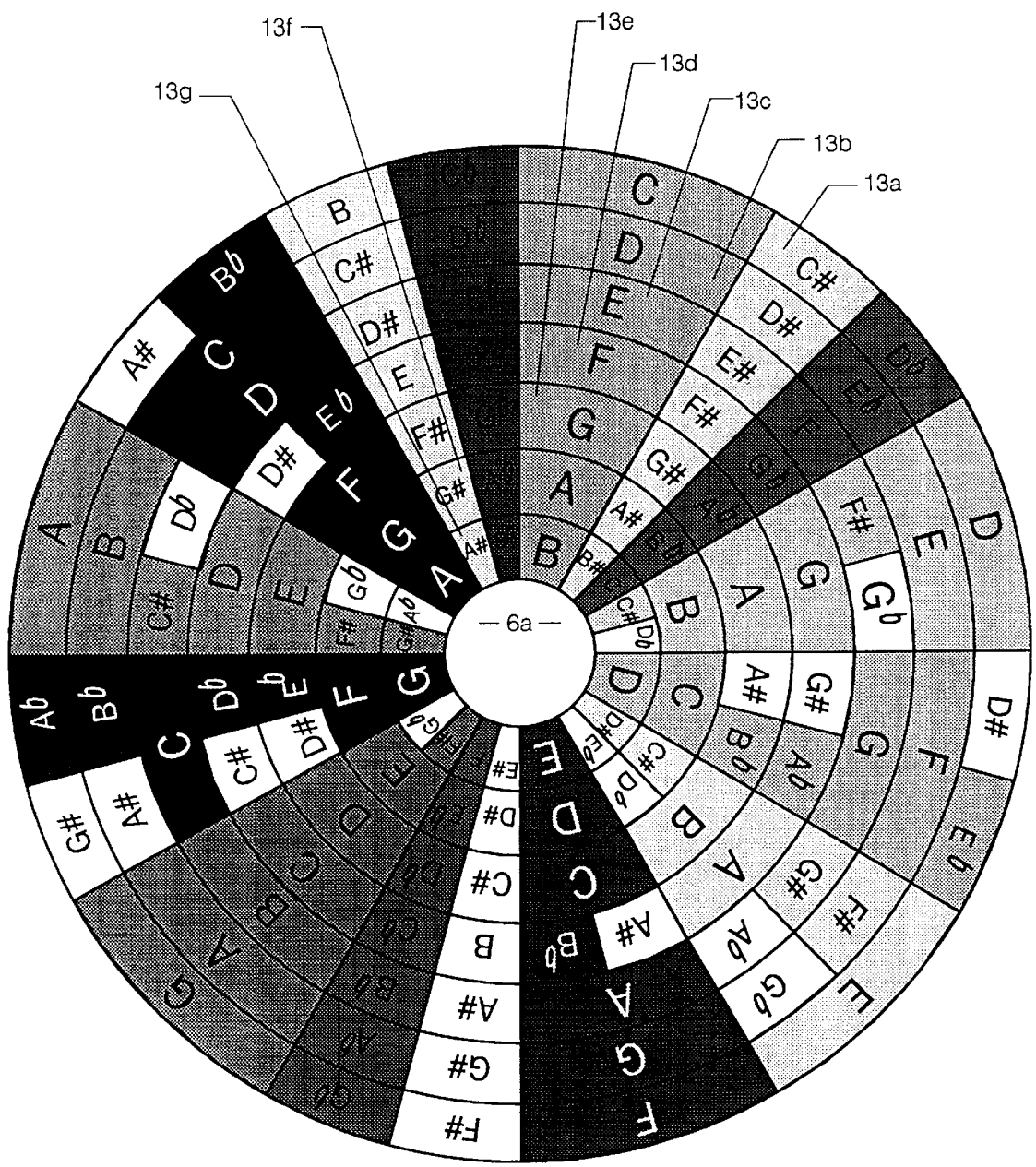
FIG. 2 is a diagrammatic view of another form of the music teaching aid in the shape of a disc and wherein the reference rings are in the form of concentric circles.

In the embodiment depicted in FIG. 2, the reference rings 13a–13g are all substantially co-planar and concentric with a central pivot 6a which forms an axis about which the rings will rotate.

Various methods of constructing this form of the invention as is known in the art may be employed. For instance the music teaching aid may include a cage (not shown in the drawings) which is constructed in a manner that it will contain and support the reference rings 13a–13g so that each ring can be rotated independently of the contiguous ring and be maintained in its relative contiguous position.

This form of the invention can also be constructed with a back plate (not shown in the drawings) on which the reference rings 13a–13g are supported. The rings themselves and/or the surface of the back plate can be formed with suitable restraining means to allow the rings to be freely rotated and yet restrained in their relative concentric positions.

Various other forms of construction of suitable means for maintaining the reference rings 13a–13g is a concentric relationship are also envisaged and encompassed within the scope of this invention.

In a yet further form, the music teaching aid can be constructed so as to be essentially in the form of a cone, a truncated cone, a sphere, or a barrel shape. In such a case the reference rings will be suitably mounted on the surface of the base member so as to have rotatory movement in relation to each other and be retained in their correct spatial position.

Figure 16:
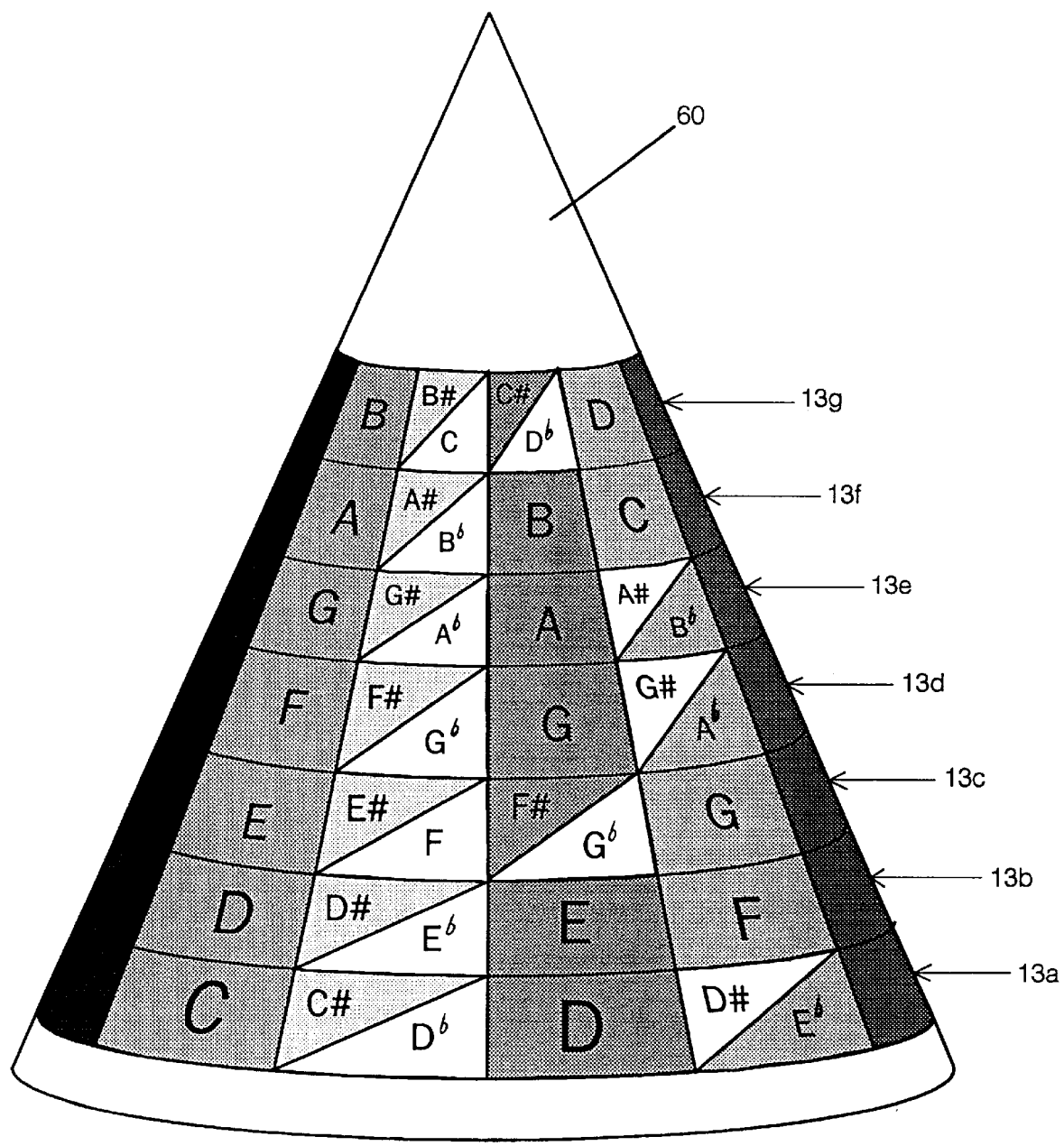
FIG. 16 is a view of the teaching aid in the shape of a cone.
Figure 17:
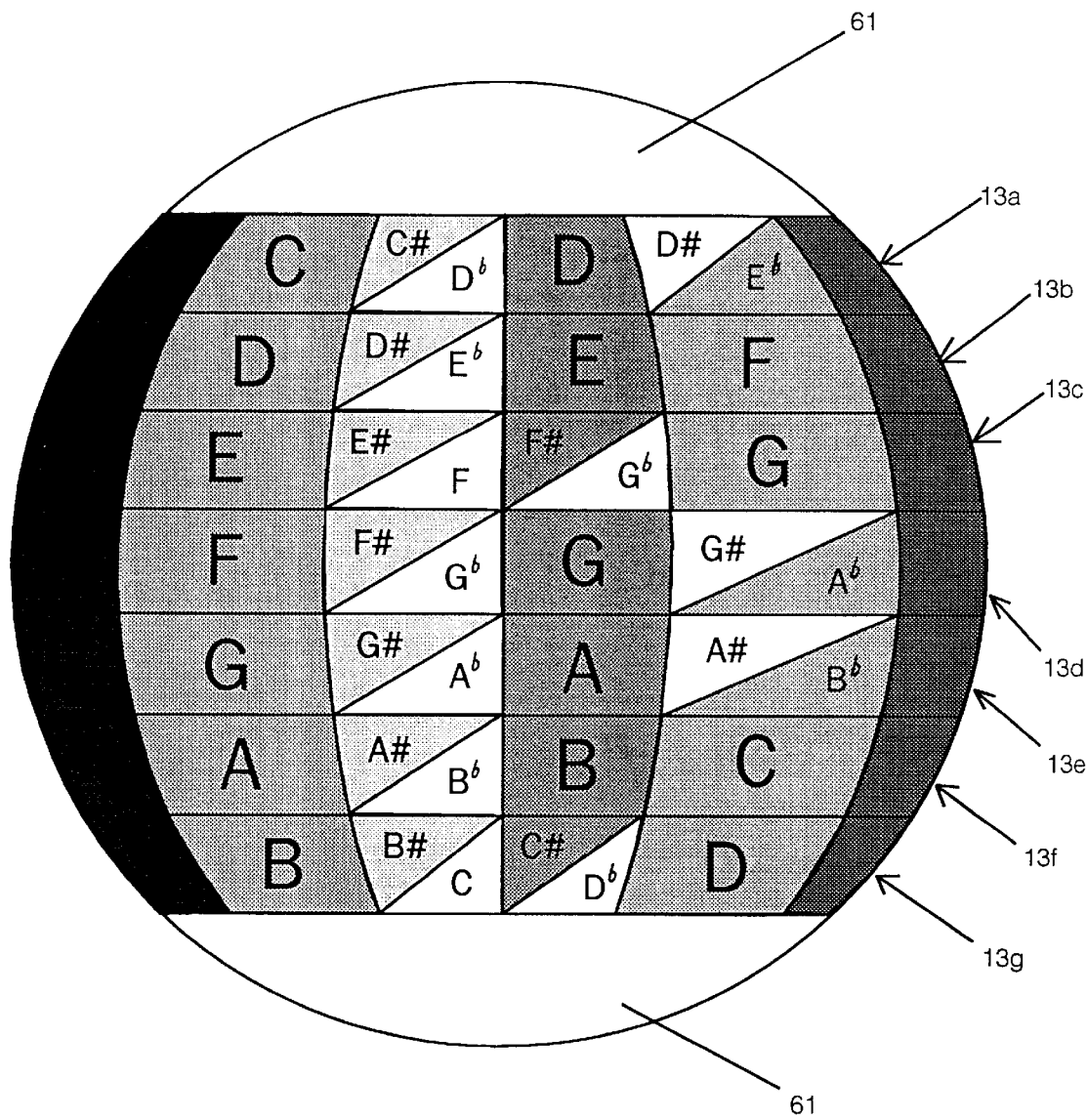
FIG. 17 is a view of the teaching aid in the shape of a sphere.

As shown for instance in FIG. 16 the music teaching aid can be in the form of a cone with the reference rings 13a–13g occupying most of the surface of the cone. The apex 60 of the cone can be left blank or can have appropriate indicia as required. A further example of an alternative shape of the music teaching aid is illustrated in FIG. 17 which is a diagrammatic view of the music teaching aid when in the shape of a sphere. In this shape, all or part of the surface of the sphere may be occupied by the reference rings 13a–13g and the sphere may include end pieces such as the caps illustrated at 61 which may or may not be in the form of a reference ring or may be left blank or incorporate other indicia as desired.

It is preferred the reference rings will be ordered so that when the music teaching aid is presented for use, the reference ring 13a will be at the top when the device is of a shape other than a disc. When the music teaching aid is in the form of a disc, the outermost reference ring 13a will occupy the space nearest the periphery of the disc as illustrated in the drawings. However the arrangement of the reference rings can be altered so that the reference ring 13a can be adjacent the bottom or adjacent the axis depending upon the shape of the music teaching aid. In this arrangement, the scale will then read as an ascending scale from adjacent the bottom or from adjacent the axis of the music teaching aid as appropriate. One example of an ascending scale is illustrated in FIG. 16 which is a view of the conical form of the music teaching aid.

Figure 3:
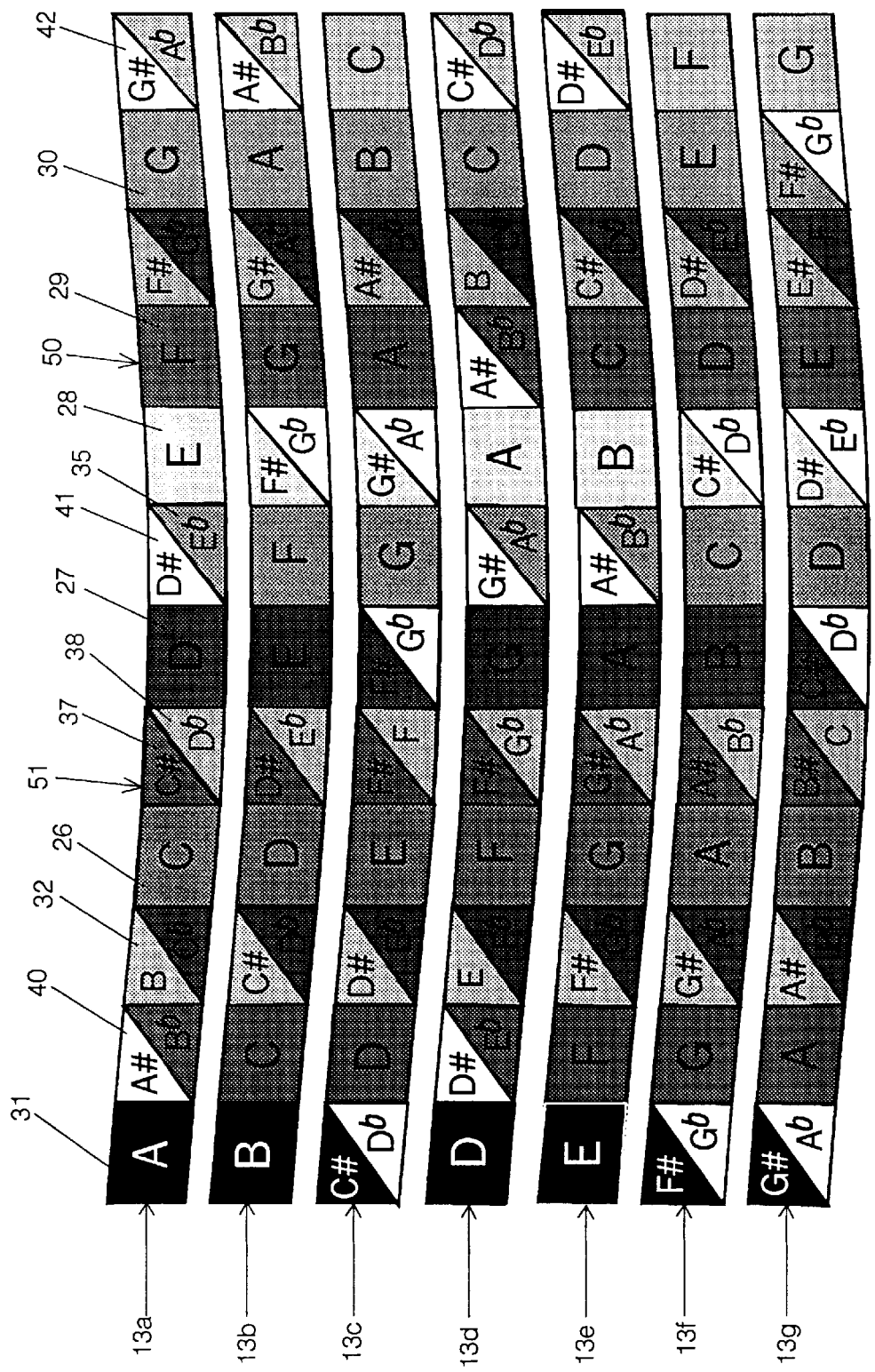
FIG. 3 is an exploded view of the peripheral surface of the reference rings of the music teaching aid shown in FIG. 2 wherein the peripheral surface is divided into a number of segments and wherein each segment is a specific colour or colours and wherein the character or characters are formed of a different or contrasting colour.

FIG. 3 illustrates the segments of the peripheral surface of the reference rings 13a–13g. As indicated in FIG. 3, each segment has a particular identifying colour which is preferably taken from the colour of the rainbow. In this figure, the C Major scale as it appears vertically, receives the first prismatic colour of the rainbow (red) which is represented by the numeral 26. While it is preferred the colours be prismatic, this is not essential. The essential requirement is that he colours are chosen to identify the scales and the notes are assigned specific colours to define an interrelationship with the manner in which colours change. Each segment also includes a character or characters which represent a note on the chromatic scale.

Starting from the segment referenced 26 in the reference ring 13a (see FIG. 3) which represents and contains the character C, and moving along the reference ring horizontally from left to right, each segment containing the diatonic notes of the C Major scale (C, D, E, F, G, A, B) is ascribed a prismatic colour in the order they appear in a rainbow. Hence, the segment 26 containing the character C appears red, the segment 27 containing the character D is orange, the segment 28 containing the character e is yellow, the segment 29 containing the character F is green, the segment 30 containing the character G is blue, the segment 31 containing the character A is indigo and the segment 32 containing the character B is violet. When all the red segments are aligned vertically, the music teaching aid will display all the notes in the C major scale. In addition, all the major scales will be aligned and be identifiable by colour.

Whilst still moving along the reference ring 13a horizontally, the chromatic notes that fall between the diatonic notes of the C scale, being notes that are the first or tonic note of a major scale, receive an intermediate colour. For example, E♭ on the reference ring would appear a flatter tone of yellow 35, enabling it to be identified as a scale in its own right, whilst also demonstrating it to be of a flatter tone both visually and aurally than the following noise E which is identified by the colour yellow 28.

In the case of major scales that are enharmonic equivalents, that is scales that are identical to musical pitch but can be written two different ways (i.e. C# & D♭), two intermediate colours are adopted i.e. C# is ascribed a brighter shape of red 37 whilst D♭ is ascribed a flatter shade of orange 38.

There are three enharmonic major scales on the music teaching aid, they are the B Major scale also known as the C♭ Major scale, the C# Major scale also known as the D♭ Major scale and the F# Major scale also known as the G♭ Major scale.

The other notes that appear on the reference ring 13a in triangular segments are not coloured but appear white are A# 40, D# 41 and G# 42. These notes are not coloured as they do not form the tonic or basis for an accepted major scale.

Major scales must always follow alphabetically, so as such where an enharmonic note appears in a scale the note that is in correct alphabetic sequence is the one coloured to match the scale. For example, in the F Major scale 50, B♭ on the reference ring 13d appears green and its enharmonic equivalent A# is white, indicating that B♭ is the correct name for that note in that scale.

In an alternative form the character A# on the reference ring 13d could appear as a brighter shade of yellow, still indicating that it is not the correct note name for the F major scale, while still demonstrating that it is higher in all respects, that is prismatically, alphabetically and aurally to the note A directly to the left of the note A# on the reference ring 13d. This alternative form can be utilised for all the enharmonic notes that currently appear on the music teaching aid as shown in the drawings in white triangular segments.

The triangular segmentation on the music teaching aid is highly relevant. Using the enharmonic equivalent C#/D♭ scale 51 as an example it will be apparent that the upper triangular segment contains the C# and as such demonstrates that it is higher in all respects to the preceding C, not only alphabetically but prismatically and in the pitch producing version of the music teaching aid, aurally. Consequently its enharmonic equivalent D♭, appears in the lower triangular segment demonstrating that it is lower in all respects to the following D. This becomes even more significant with the acquisition of further musical knowledge, i.e. the music teaching aid helps the user to identify those scales which are considered the flat scales (the scales which incorporate flat notes) and the sharp scales (those scales which incorporate sharp notes).

According to the form of the invention used, different combinations of colour codings can be employed.

Figure 4:
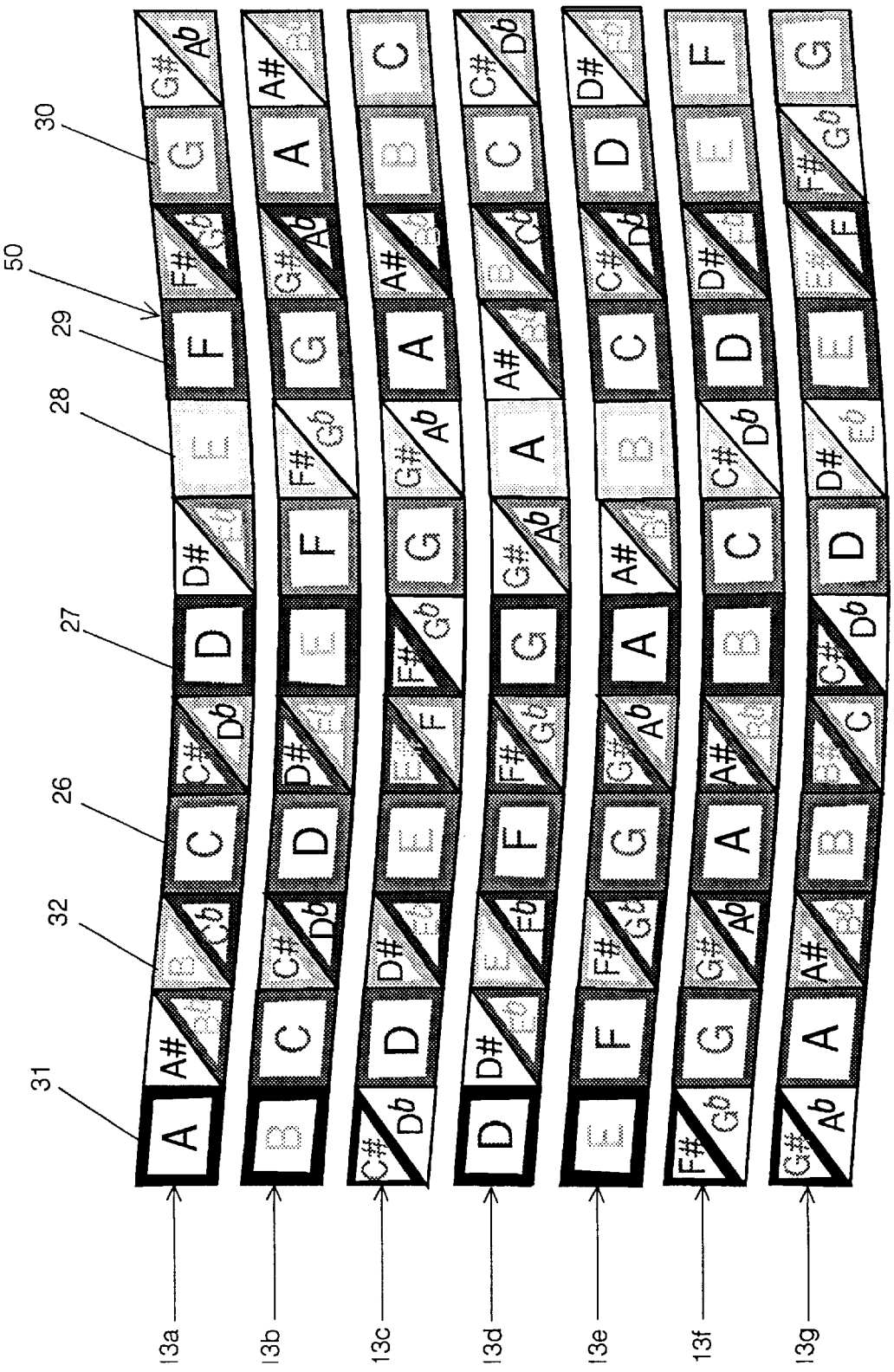
FIG. 4 is a view of a modification of the reference rings shown in FIG. 3 wherein each segment has a border of a specific colour and wherein each segment includes a coloured character or characters representing a note on the chromatic scale. The area within the border is of no colour or is a neutral colour.

As shown in FIG. 4, the C major scale as it appears vertically has borders 26 which are the colour red, being the first prismatic colour of the rainbow. In addition, the characters within the red borders 26 of the C major scale as it appears vertically also receive a prismatic colour. Hence the character C in the reference ring 13a is red, the character D in the reference ring 13b is orange, the character E in the reference ring 13c is yellow, the character F in the referenced ring 13d is green, the character G in the reference ring 13e is blue, the character A in the reference ring 13f is indigo and the character B in the reference ring 13g is violet. Consequently a colour coding system is provided which enables the user to identify the notes in any major scale without any prior musical knowledge.

Whilst still moving along the reference ring 13a in a manner consistent with the colour coding system already described in relation to FIG. 3, the chromatic notes that fall between the diatonic notes of the C major scale, being the notes that are the first or tonic note of a major scale, receive an intermediate colour around their border. For example the border of the note E♭ on the reference ring 13a would have a flatter tone of yellow. The character E♭ within the border would also be the same flatter tone of yellow. This enables the character to be identified as a scale in its own right and demonstrates it as being a flatter tone both visually and aurally than the following note E which is identified by both the border 28 and the character being coloured yellow.

The colour coding system thus described in relation to FIG. 4 is consistent with the colour coding system described in relation to FIG. 3 except that the borders are now coloured to assist the user to access the major scales. Similarly the characters also are assigned their individual colours.

Figure 5:
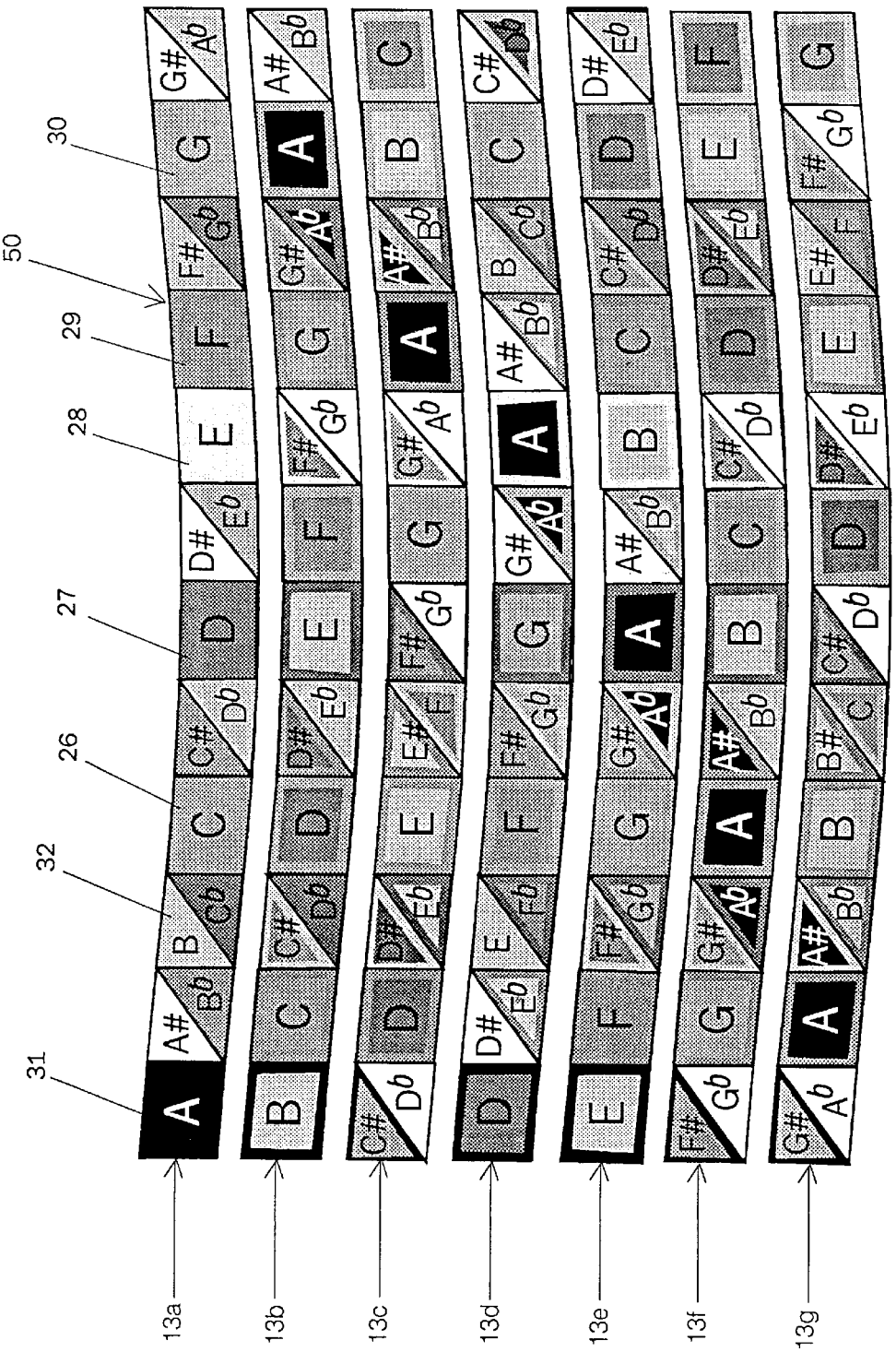
FIG. 5 is a view of a further modification of the reference rings shown in FIG. 3 wherein the first reference ring is the same as the first reference ring of FIG. 3. The remaining reference rings have a border of a specific colour, with the characters having no colour or a neutral colour. The area between the border and the character has a specific colour which is different to the colour of the border.

In FIG. 5, the colour coding system follows the same principle as that described for FIG. 4 with the borders being coloured in substantially the same manner. However the remainder of the segments, that is the part between the borders and the characters are coloured similarly to that described in relation to the characters in FIG. 4 with the characters now being of a neutral colour or of no colour. As a result the visual appearance of the reference ring 13a shown in FIG. 5 will be essentially the same as that of the reference ring 13a of FIG. 3.

A further example of the colour coding system shown in FIGS. 4 and 5 will now be described using the scale F major referenced 50 as it appears vertically.

In FIG. 4, the character F on the reference ring 13a is coloured green, the border is also green. The character G on the reference 13b is coloured blue and the border is coloured green which identifies it as the note G diatonic to the F major scale. The character A on the reference ring 13c is coloured indigo and the border is coloured green which identifies it as the note A diatonic to the F major scale. The character B♭ on the reference ring 13d is coloured an intermediate tone between indigo and violet and the triangular border is coloured green identifying it as the note B♭ diatonic to the F major scale. The character C on the reference ring 13e is coloured red and the border is coloured green identifying it as the note C diatonic to the F major scale. The character D on the reference ring 13f is coloured orange and character C may be of no colour or a neutral colour and may be outlined as illustrated or have no outline. The notation 82 may have a neutral colour or no colour and have an outline or no outline as desired.

Figure 10:
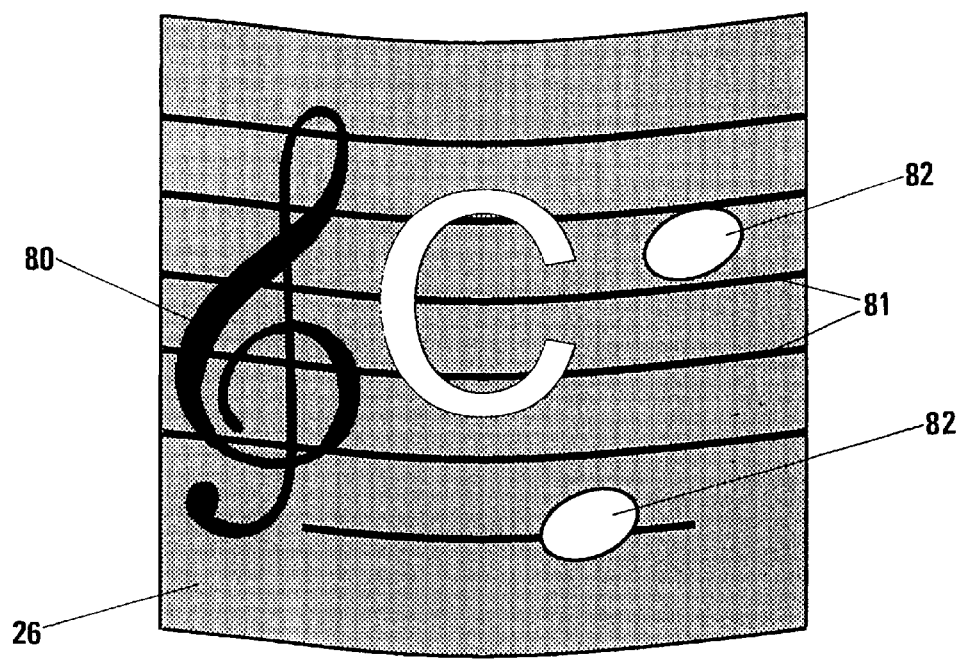
FIG. 10 is an enlarged view of atypical segment of a reference ring indicating additional optional indicia.
Figure 11:
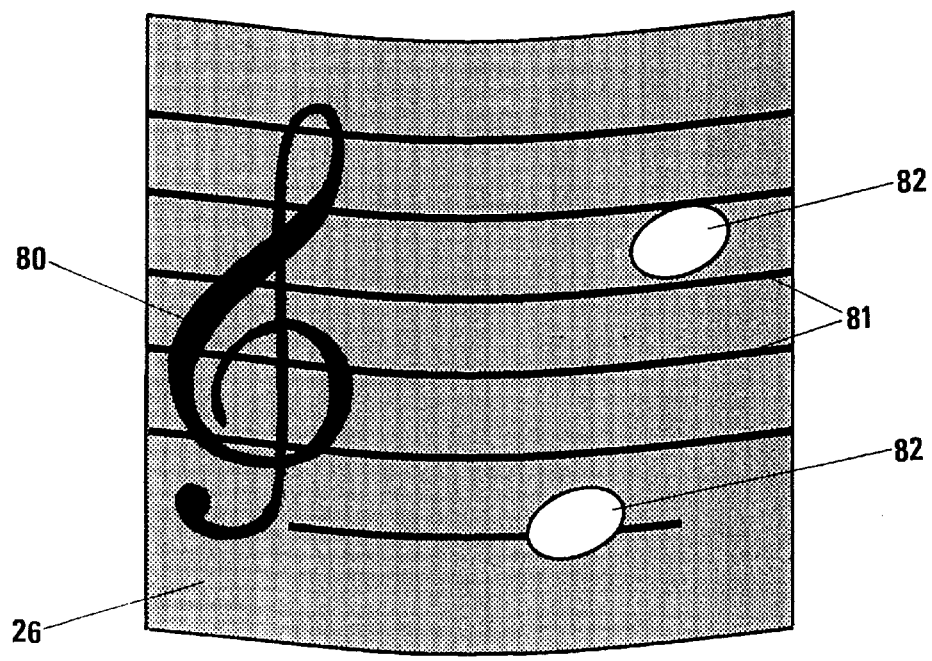
FIG. 11 is a view similar to FIG. 10 but indicating alternative optional indicia.

FIG. 11 illustrates a variation of the segment as illustrated in FIG. 10. This segment includes the colour 26, the bass or treble clef sign 80, the lines 81 of the staff and the single or double notation 82. However in this Figure, the character C has been removed, so that the note is identified solely by the colour 26 and the location of the notation on the staff.

Figure 12:
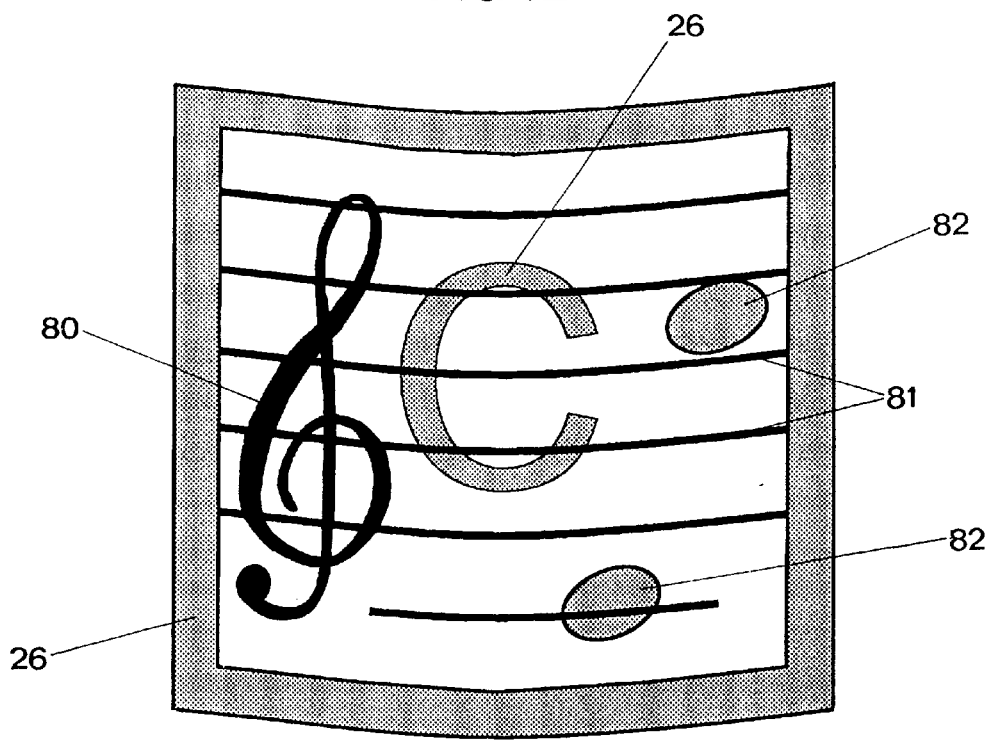
FIG. 12 is a view similar to FIG. 10 indicating a further alternative form of indicia.

FIG. 12 illustrates an enlarged view of an example of a segment which contains the character C as illustrated in the reference ring 13a shown in FIG. 4. In this view, the bass or treble clef sign 80, the lines 81 of the staff and the single or double notation 82 are illustrated. However as shown in this Figure and consistent with the example shown in FIG. 4, the segment includes a border coloured red 26 as is the character C and optionally the notation 82. The notation 82 may be outlined or have no outline as appropriate if the notation consists of a colour.

Figure 13:
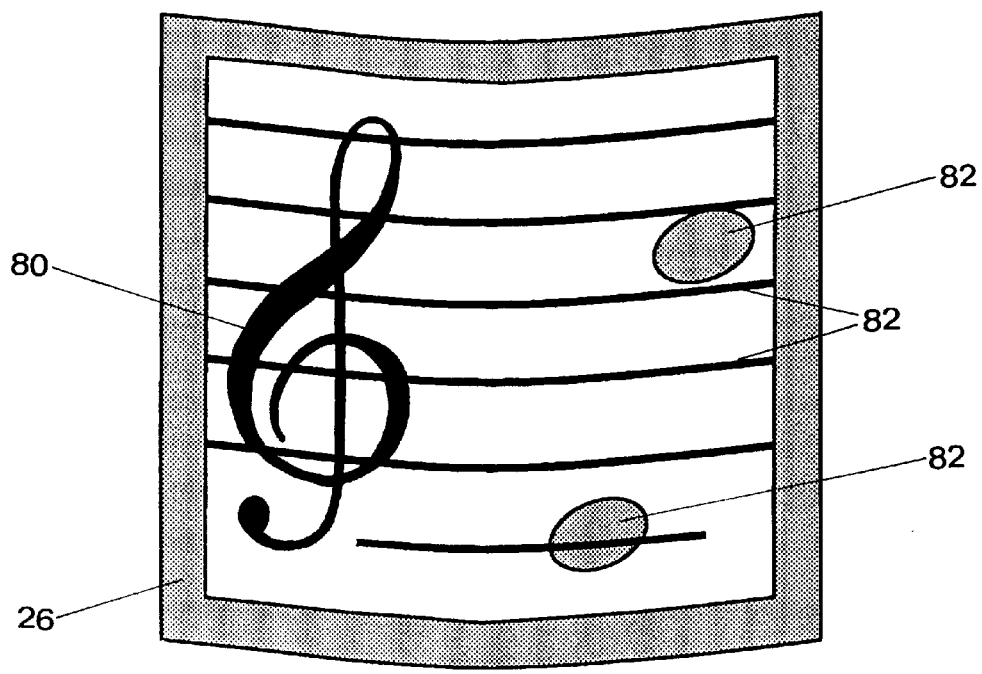
FIG. 13 is a view similar to FIG. 10 indicating a yet further alternative form of indicia.

FIG. 13 illustrates another embodiment and is similar to the embodiment shown in FIG. 12 except that the character C has been removed so that identification of the note is solely by the colour red 26 which comprises the border and optionally the notation 82 which as illustrated in relation to FIG. 12 may optionally be outlined or have no outline.

In the embodiments illustrated in FIGS. 10 through 13, in each case the segment can display either all or some of the additional indicia, that is the bass or treble clef, the lines of staff and/or the notation which may be single or double as desired.

Figure 6:
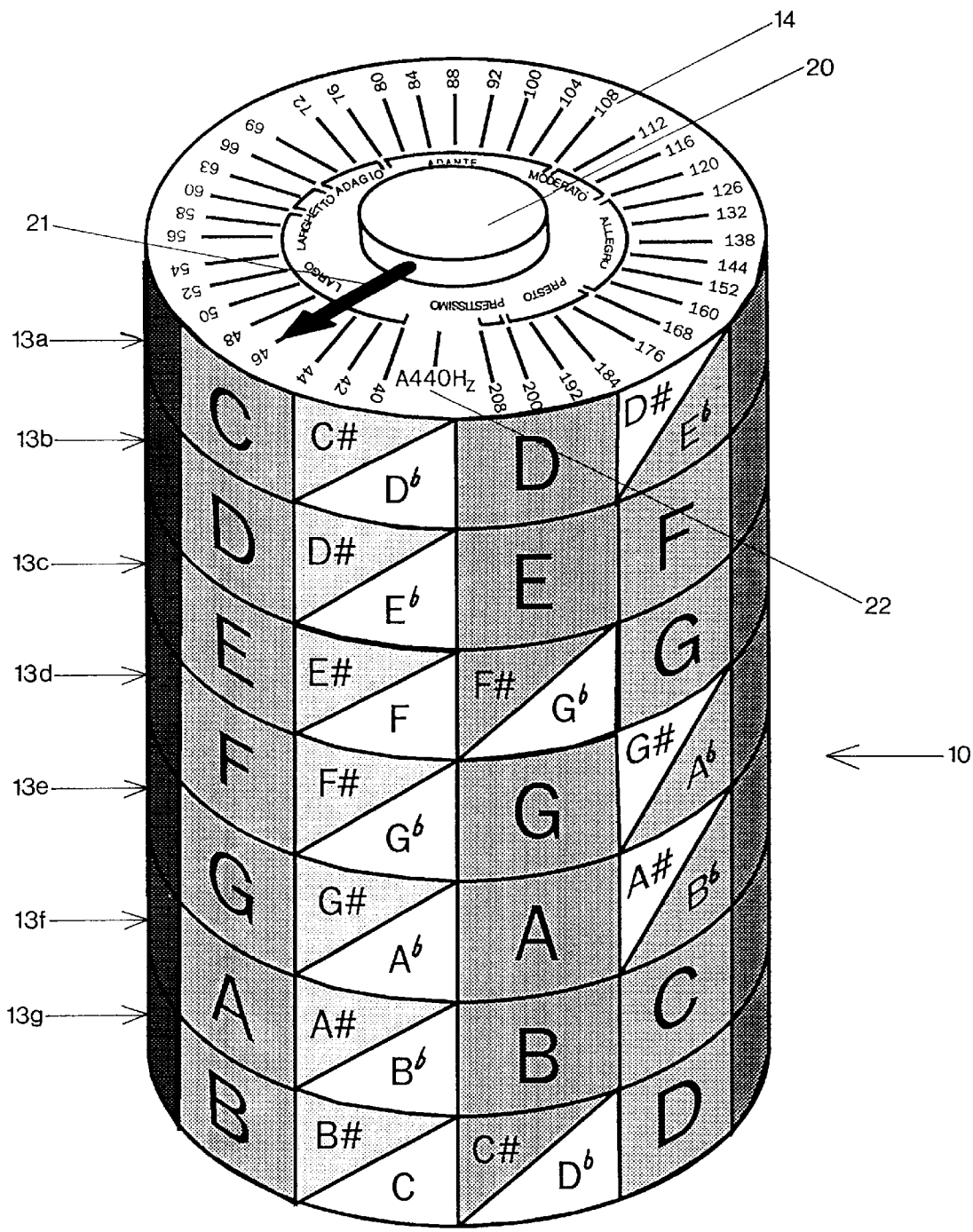
FIG. 6 is a diagrammatic view of a form of the music teaching aid similar to that shown in FIG. 1 and which includes a means to generate a repetitive audible pulse and which has the operating control for the means formed in one end face of the teaching aid.

As shown in FIG. 6, the music teaching aid, which is similar in construction to the music teaching aid of FIG. 1 may include a metronome facility which will deliver an audible repetitive beat in the form of a staccato pulse of a single tone or a burst of combined tones whether tonal or atonal, white noise or other desired audible signal. Such audible signal can be augmented by a visual signal, such as a light emitting diode or the like. The pulse can be generated by any suitable electronic or electro-mechanical means as is known in the art.

In this form of the music teaching aid, the beat producing mechanism is preferably housed within the body 10. Electrical power to operate the beat producing mechanism may be provided by means of an external DC input or by an internal electrical storage battery of known form. Access to the storage battery is provided in the body 10 and if the battery is of the rechargeable type, a suitable DC inlet (not shown in the drawings) is also provided to enable a charging current to be supplied to the battery. In addition there may be provided a suitable sound transducer for the audible signal, an on/off switch, a volume control which can be rotary or sliding and an audio output jack (none of which are shown in the drawings).

One end face of the body 10 shown in FIG. 6 displays a chart 14 on which is inscribed a range of beat frequencies available with the music teaching aid. This range can vary according to the particular circumstances and requirements. The beat frequencies are selected by rotating the adjustment knob 20 which includes a suitable pointer such as that indicated at 21. The adjustment knob 20 is connected directly or indirectly to a multi-position switch which will enable different combinations of electrical paths to be selected to in turn enable initiation of the desired beat frequencies.

In a modification of the invention, the chart 14 can also include an indication of a standard reference frequency such as that shown at 22 so that when the adjustment knob 20 is rotated to allow the pointer 21 to index with the mark signifying the reference frequency 22, the music teaching aid will emit a pure continuous tone of that frequency.

Figure 7:
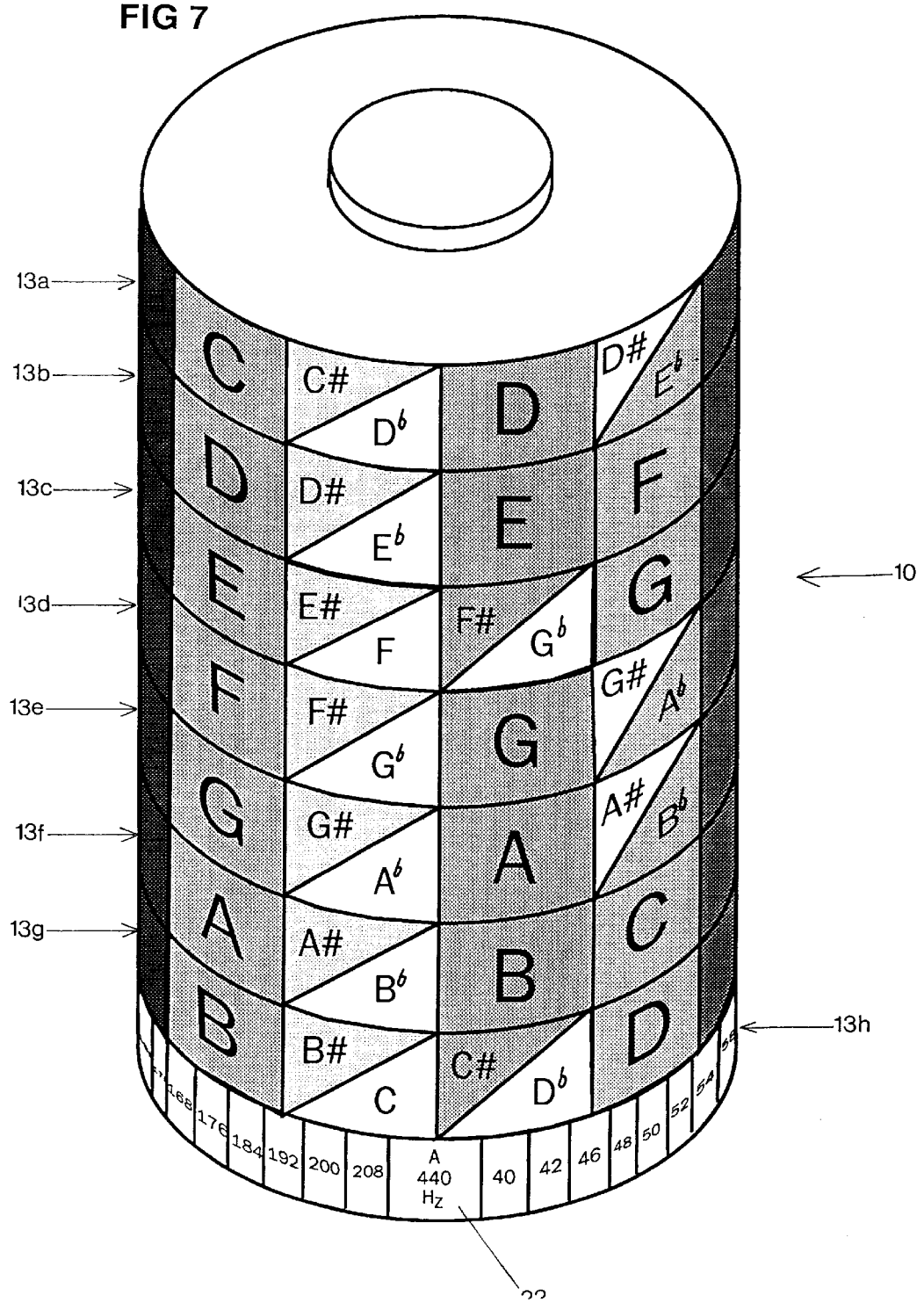
FIG. 7 is a diagrammatic view of another form of the music teaching aid shown in FIG. 1 which includes means to generate a repetitive audible pulse and which has the operating controls for the means included in an auxiliary reference ring.

In the modification of the invention shown diagrammatically in FIG. 7, an auxiliary reference ring 13h is substituted for the chart 14 and the switching mechanism associated with the chart. This ring which may also be in the form of a sleeve, is provided with a series of internal electrical contacts so that when the ring has been rotated to a desired indexing position, appropriate electrical contacts are made to make an electrical circuit to initiate the desired beat frequency or frequencies. In this modification the reference ring can also include a reference frequency position 22 to perform the same function as that described for FIG. 6.

In this form of the invention, the music aid includes seven reference rings 13a–13g and a metronome ring 13h. The metronome ring 13h is provided with a series of internal electrical contacts so that when the ring 13h has been rotated to a desired indexing position, appropriate electrical contacts are made to make an electrical circuit to initiate the desired beat frequency or frequencies.

Figure 8:
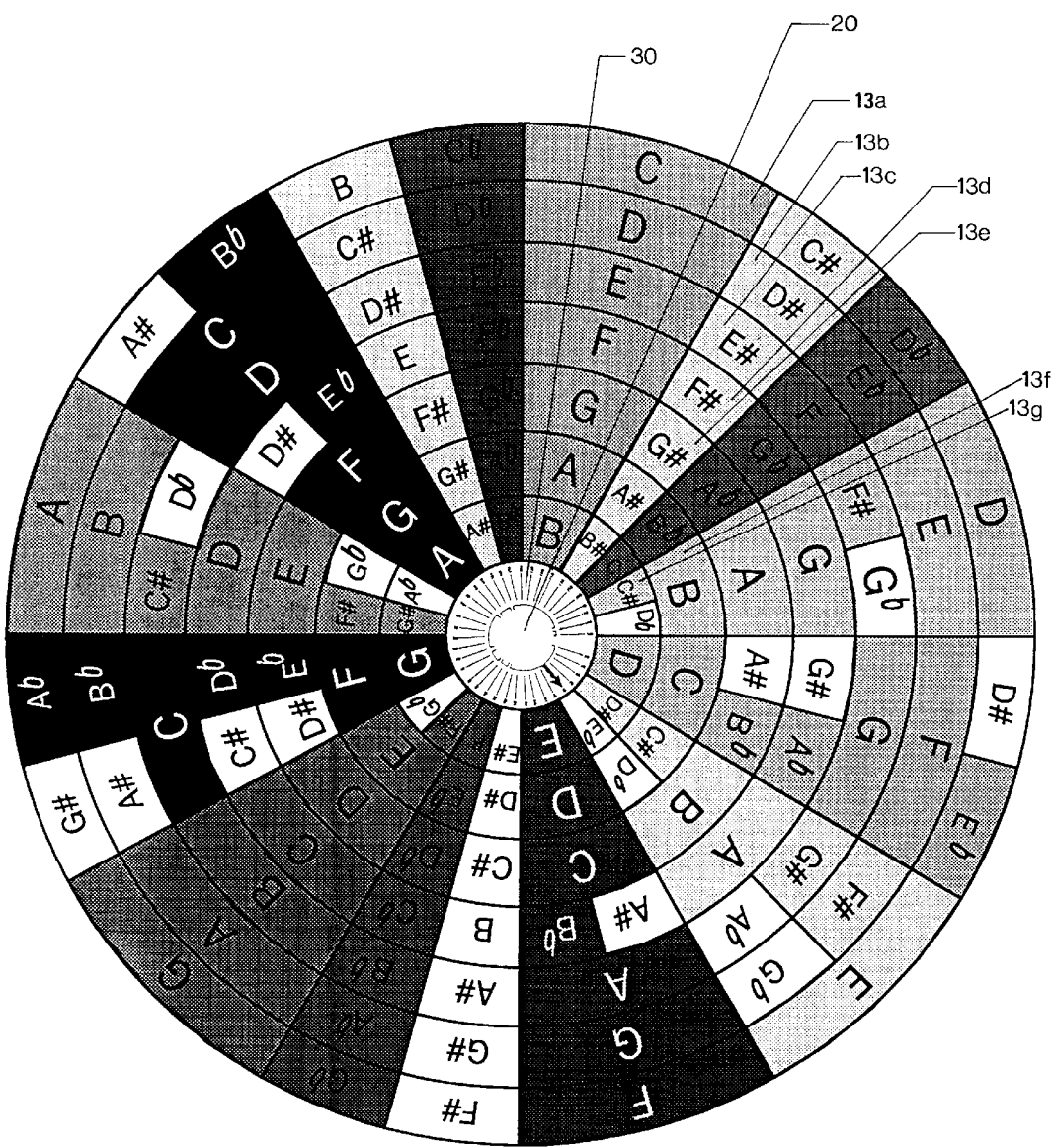
FIG. 8 is a diagrammatic view of the music teaching aid shown in FIG. 2 and which includes a means to generate an audible repetitive pulse and wherein the operating controls for the means are provided in the form of an axial boss.
Figure 9:
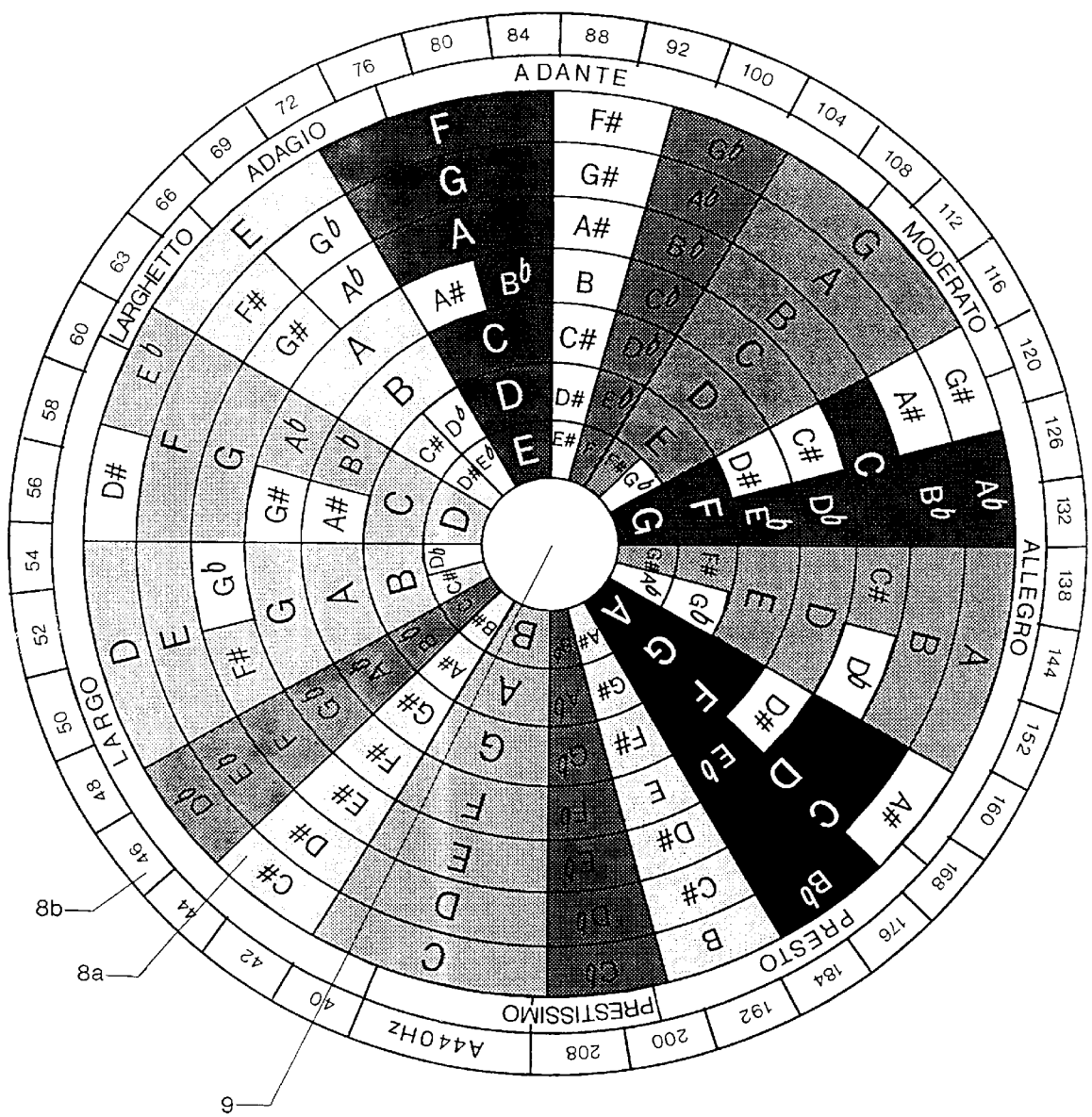
FIG. 9 is a diagrammatic view of the form of music aid shown in FIG. 2 and which includes means to generate an audible repetitive pulse and wherein the operating controls for the means are in the form of a concentric ring.

FIG. 8 illustrates another form of the invention in which the music teaching aid is in the form indicated in FIG. 2 in that it has seven reference rings 13a–13g. This form of the invention also includes a selective utility for the metronome facility and in this form, the selective utility is comprised of a chart 30 inscribed concentrically around the axial centre of the music teaching aid. The chart may include an indicator knob 20 which is connected directly or indirectly to a multi-position switch to operate in a similar manner to the knob 20 and the multi-position switch described in relation to FIG. 6. The chart may also be provided with a reference tone position of similar construction to that described in relation to FIG. 6.

It is to be understood the metronome facility can be applied to any form of the music teaching aid, whether it be in the shape of a cylinder, barrel, sphere, disc or cone of which general examples only are shown in the drawings accompanying this specification.

The music teaching aid can be adjusted to a descending melodic minor mode to display descending melodic minor scales in many ways. Three ways of doing this are described below but they are given by way of example only and are not intended to be limiting an any way.

One way is to align the reference rings 13a–13g with respect to a known descending melodic minor scale.

Another way is to adjust the music teaching aid from its reference position (ie the major mode) by flattening the second, third and sixth notes of the descending scale by one semitone, that is, rotating the reference rings 13g, 13f and 13c respectively one segment in a clockwise direction.

Yet another way is to adjust the music teaching aid from the ascending melodic minor mode by flattening the second and third notes of the descending scale by one semitone, that is, rotating the reference rings 13f and 13g one segment in a clockwise direction.

The preferred form of music teaching aid of the invention can be used to determine a variety of other musical relationships. For example, the music teaching aid can be used to identify relative major and minor scales, that is scales that share the same number of sharps or flats. This is useful as it is common for music to shift keys or modulate from a major key to the relative minor key or vice versa.

The last three notes of a major scale form the first three notes of its relative minor. Conversely the tonic of the relative major of a minor key is the third note of the minor scale.

The relative minor of major scale can be found in many ways. Two ways are described below but they are given by was of example only and are not intended to be limiting in any way.

One way is to begin with the music teaching aid in the major mode, rotate the device as a whole until the reference ring representing the key of the chosen major scale is in clear view (eg C major). The note indicated on the corresponding segment of the reference ring 13f will be the tonic of the relative minor scale. The music teaching aid can then be adjusted to the appropriate minor mode and the scale read down form the segment of the reference ring that indicates that tonic.

Another way is to start with the music teaching aid in the appropriate minor mode, rotate the entire device until the segment of the reference ring indicating the key of the major scale (C) is in clear view and count in an anticlockwise direction three segments on the reference ring (ie from C to A) to give the tonic of the relative minor scale below which the notes of that scale will be displayed.

The relative major of a minor scale can be found in many ways. Two ways are described below but they are given by way of example only and are not intended to be limiting in any way.

One way is to begin with the music teaching aid in the minor mode, rotate the device as a whole until the reference ring representing the key of the chosen minor scale is in clear view (eg A harmonic minor). The note indicated on the corresponding segment of the reference ring (C) will be the tonic of the relative major. The music teaching aid can then be adjusted to the major mode and the scale read down from the segment of the reference ring that indicates that tonic.

Another way is to start with the music teaching aid in the major mode, rotate the entire device until the segment of the reference ring indicating the key of the minor scale (A) is in clear view and count forward in a clockwise direction three segment on the reference ring (ie from A to C) to give the tonic of the relative major scale below which the notes of that scale will be displayed.

Figure 14:
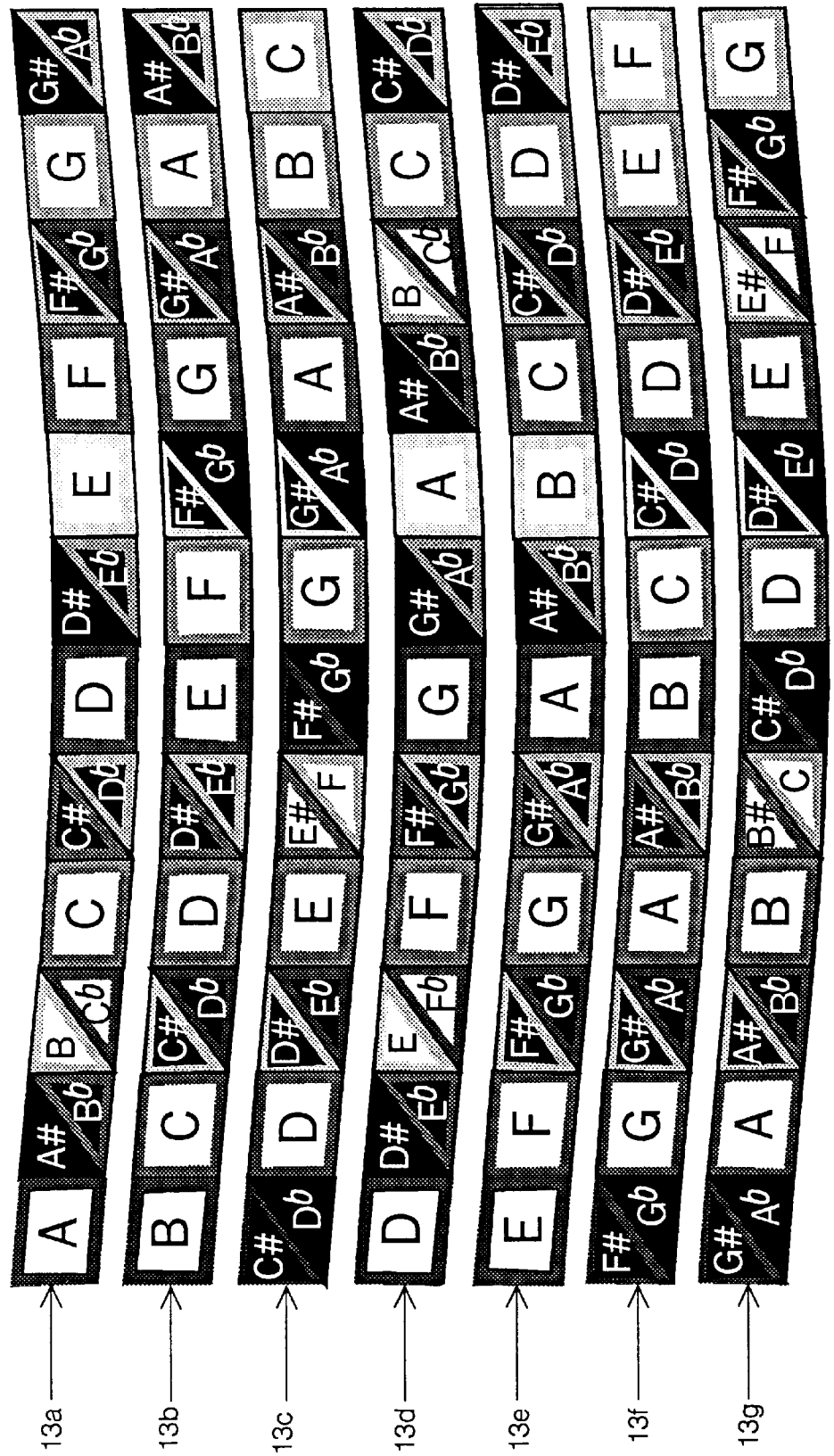
FIG. 14 is a view of the reference rings illustrating a further alternative form of colour coding.

FIG. 14 illustrates a further form of colour coding that may be particularly suitable for instance for piano or keyboard students. As shown in this Figure, the borders outlining the segments are colour coded in a manner consistent with that described in relation to FIG. 4. The characters within the segments may be optionally coloured in the manner described for FIG. 4 or can be of no colour or a neutral colour. In this embodiment, the segments that correspond to the black keys on a piano keyboard have the area between the border and the character coloured black or a dark colour. Alternatively, the area between the border and the character on the segments that correspond to the black keys on a piano keyboard can be white or a neutral color with the indicia being black or a dark colour.

Figure 15:
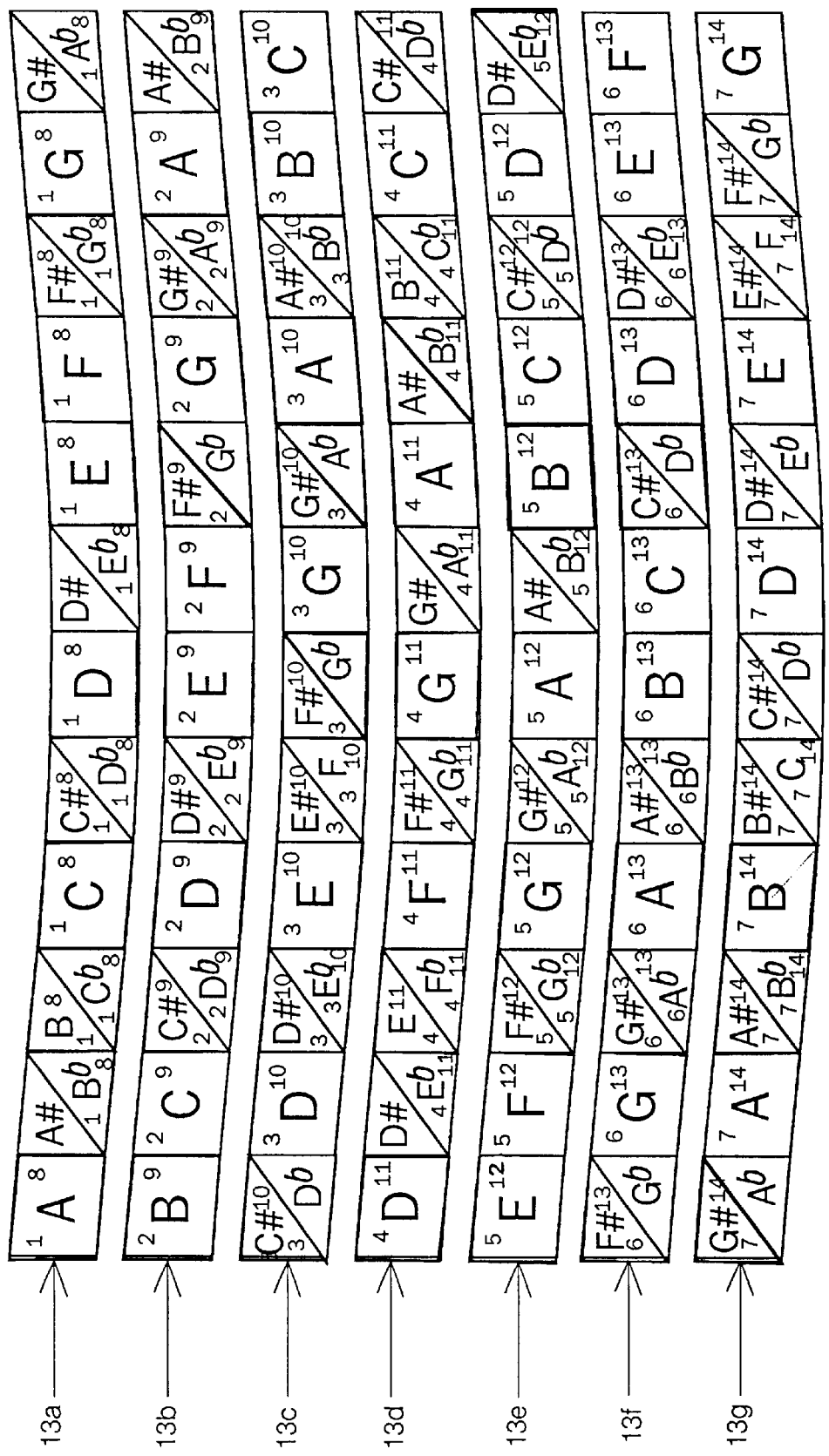
FIG. 15 is a view of the reference rings illustrating the inclusion of a numbering system.

FIG. 15 illustrates a yet further modification of the music teaching device. In this embodiment, each segment contains a character representing a note and also includes a numbering system to represent the notes. The numbers may be coloured using the colour coding system hereinbefore described. In a further modification of the invention as illustrated in this Figure, the alphabetical characters can be coloured in accordance with the colour coding system. In a yet further modification, the alphabetical characters can be dispensed with and the numerical characters coloured in accordance with the colour coding system. The embodiment illustrated in this Figure will be of particular application by for instance students and teachers of jazz music who may use numbers in the explanation of theory.

The music teaching aid of the present invention can optionally include means capable of producing an audible tone corresponding to the indicia displayed on a selected segment or segments. Such means can also reproduce a successive or simultaneous audible tone or tones corresponding to a series of selected segments. Various forms of construction are envisaged, such as the use of touch sensitive or proximity sensitive electrical switches which make contact with or connect electrical circuits to initiate the production of the audible tone or tones. This feature will allow the user to hear the notes or scales selected and to relate written music to musical sounds. In addition this feature will allow the student to appreciate how the different types of scales actually sound.

The foregoing describes preferred forms of the invention and it is to be understood the scope of the invention is not to be limited to the specific forms described.

The music teaching aid can be of any suitable geometric or non geometric shape and the reference rings can be of co-axial or concentric form or any of the desired shapes. The invention is not to be restricted to the particular shapes illustrated in the drawings which are given as examples only of some of the shapes contemplated.

Modifications and variations may be made to the embodiments without departing from the spirit or scope of the invention as defined in the attached claims.

I claim:

1. A music teaching aid comprising a plurality of reference rings each independently rotatable about a common axis, each ring having a surface divided into twelve segments with each segment comprising indicia representing a note of the chromatic scale with indicia for a musical note which has enharmonic equivalents displaying both enharmonic equivalents, each segment individually identified by a color in a color coding system such that when the reference rings are rotated relative to one another to align selected segments of successive of said reference rings according to the color coding system the indicia of the selected and aligned segments representing the notes of a non-chromatic scale, the color coding system being such that non-diatonic notes are indicated by brighter or flatter versions of a color of a diatonic note.

2. A music teaching aid according to claim 1 comprising seven or more said reference rings.

3. A music teaching aid according to claim 1 wherein the colors of segments of the ring alter prismatically along the ring.

4. A music teaching aid according to claim 3 wherein a segment having indicia for a note which is a sharp or a flat of a note indicated on a next adjacent segment of the same ring is of a different hue to that color of said next adjacent segment.

5. A music teaching aid according to claim 1, wherein the color of a segment of a reference ring which has indicia representing a note between the diatonic notes of a scale is a color which is intermediate between the colors of segments of the same reference ring which represents the diatonic notes on each side.

6. A music teaching aid according to claim 1, wherein a segment having said indicia representing both enharmonic equivalents of a musical note is divided into two semi-segments each semi-segment containing an indicia representing a respective one of said enharmonic equivalents.

7. A music teaching aid according to claim 6 wherein said semi-segments are a different hue of a color of the basic note.

8. A music teaching aid compromising seven or more reference rings each independently rotatable about a common axis, each ring having a surface divided into twelve segments with each segment comprising indicia representing a musical note such that successive segments represent the successive notes of the chromatic scale, each segment also being individually identified by a color in a color coding system in which non-diatonic notes are indicated by brighter of flatter hues of a color of a basic diatonic note such that when the reference rings are moved relative to one another to align segments of successive said reference rings according to the color coding system, the indicia of the selected and aligned segments of represent the notes of a non-chromatic scale, each ring also including segments which have indicia representing both enharmonic equivalents of a musical note such as to identify which of the enharmonic equivalents is correct for the type of non-chromatic scale represented by the segments aligned according to the color coding system, each segment having said indicia representing both enharmonic equivalents of a musical note is divided into part segments each part segment containing indicia representing a respective one of said enharmonic equivalents, a part segment containing a musically incorrect enharmonic equivalent is colored in a color which is distinguishable from a color of an adjacent segment of an adjacent reference ring.

9. A music teaching aid according to claim 8 wherein the notes of the C, D, E, F, G, A and B major scales have ascribed thereto recognized colors of the visible spectrum.

10. A music teaching aid according to claim 9 wherein segments located between segments having indicia representing said notes of the C, D, E, F, G, A and B major scales are coded by a hue or hues of the color of an adjacent segment representing notes between the notes of the C, D, E, F, G, A and B major scales.

11. A music teaching aid according to claim 10 wherein the reference ring has tonic notes of fifteen recognized major scales.

12. A music teaching aid comprising a plurality of reference rings each independently rotatable about a common axis, each ring having a surface divided into twelve segments with each segment comprising indicia representing a note of the chromatic scale and individually identified by a color in a color coding system such that when the reference rings are rotated relative to one another to align selected segments of successive of said reference rings according to the color coding system, the indicia of the selected and aligned segments represent the notes of a non-chromatic scale, and further including a housing in which an integral metronome to generate an audibly repetitive beat is housed.

* * * * *

UNITED STATES PATENT AND TRADEMARK OFFICE
CERTIFICATE OF CORRECTION

PATENT NO. : 6,031,172
DATED : February 2, 2000
INVENTOR(S) : Marios Gabriel Papadopoulas It is certified that error appears in the above-identified patent and that said Letters Patent is hereby corrected as shown below:

Column 2,
Line 45, replace "Invervals" with -- Intervals --.
Line 60, replace "5,805,460" with -- 1,804,460 --.

Column 3,
Line 1, replace "angular" with -- annular --.
Line 17, replace "disk" with -- disc --.
Line 25, replace "sill" with -- will --.
Line 35, replace "know" with -- known --.

Column 6,
Line 60, replace "he" with -- the --.

Column 7,
Line 21, replace "noise" with -- note --.

Column 8,
Line 65, after "orange and", insert:
-- the border is coloured green identifying it as the note D diatonic to the F major scale. The character E on the reference ring 13g is coloured yellow and the border is coloured green identifying it as the note E diatonic to the F major scale.

In Fig. 5 the same colour coding principle applies except that the areas between the borders and the characters are now assigned the same colour as the characters in Fig. 4.

The number of reference rings on the music teaching aid can be extended to display both the treble and the bass clefs and can also be made to display the chromatic scale to both directions.

By utilising the reference rings in conjunction with colours, it is possible to provide a music teaching aid that will maintain symmetry of form and the colours will maintain accessibility by the user because the user will be able quickly to identify the relationship of the notes by colour combinations.

UNITED STATES PATENT AND TRADEMARK OFFICE
CERTIFICATE OF CORRECTION

PATENT NO. : 6,031,172
DATED : February 2, 2000
INVENTOR(S) : Marios Gabriel Papadopoulas It is certified that error appears in the above-identified patent and that said Letters Patent is hereby corrected as shown below:

Fig. 10 illustrates in an enlarged view an example of a segment which contains the character C as illustrated for instance in the reference ring 13a shown in Fig. 3. In this example, the segment includes additional indicia such as treble or bass clef sign of which the treble clef sign is illustrated at 80. The segment may also include the appropriate lines 81 of the staff and notation 82, either singly or doubly as shown in the Figure. Further as shown in this Figure, the whole of the segment apart from the character is coloured red 26. The --

Signed and Sealed this

Eighteenth Day of June, 2002

*Attest:*

*Attesting Officer*

JAMES E. ROGAN
*Director of the United States Patent and Trademark Office*